Patented Sept. 5, 1939

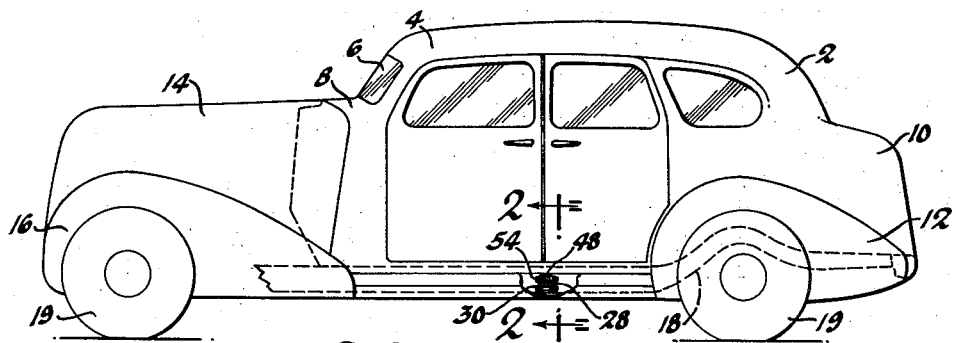
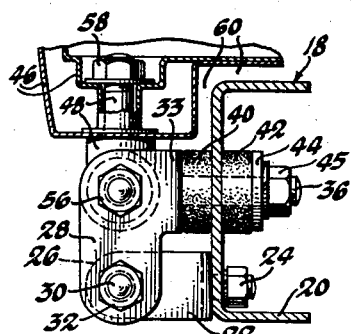
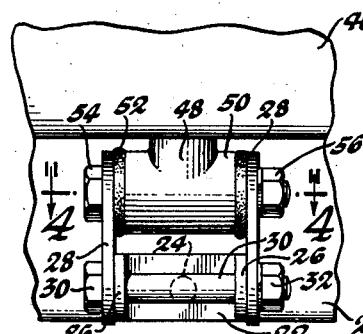
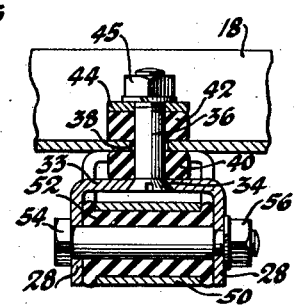
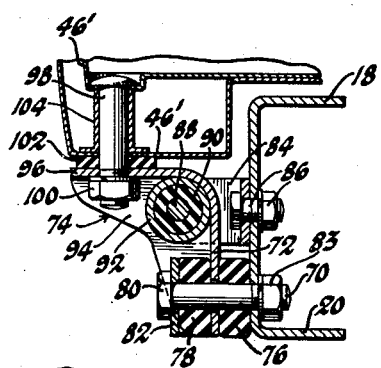
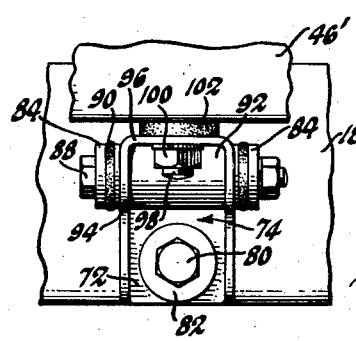

2,171,947

UNITED STATES PATENT OFFICE 2,171,947

BODY MOUNTING

Guy E. Parker, Birmingham, Mich., assignor to General Motors Corporation, Detroit, Mich., a corporation of Delaware Application February 4, 1938, Serial No. 188,604

6 Claims. (Cl. 296—35)

This invention relates to mountings and has particular reference to the mounting of an automobile body on the frame of an automotive vehicle.

In the past it has generally been the practice rigidly to mount the body on the vehicle. All the shocks and distortions to which the frame is subjected while being driven along rough roads have therefore been transmitted to the body. It is desirable to have the body so mounted on the frame that the body may partake of a limited amount of lateral and/or vertical movement with reference to the frame. At the same time these movements are permitted, it is also desirable to provide insulating means so that no noise or squeaks will arise due to the movement of the body relative to the frame. With a construction which allows a relative movement between body and frame, the shocks to which the frame is subjected are transmitted in a lesser degree to the body.

In order to allow the limited movement of the body relative to the frame, the structure of the present invention was designed, and in forming the various joints of the mountings, it was found desirable to use rubber so that the rubber itself would allow a given amount of yield or movement. The degree of hardness of the rubber will depend upon the amount of yield or movement desired, a softer rubber giving a greater amount of movement than a harder rubber.

On the drawing, for convenience of illustration, but one body mounting has been shown at each side of the vehicle. However, two, three, or more may be used to suit the needs of the builder. For a small body a lesser number of mountings will be needed than for a large, heavy, body.

On the drawing

Figure 1 is a side view of an automobile body showing the invention applied.

Figure 2 is a sectional detailed view on the line 2—2 of Figure 1.

Figure 3 is an enlarged detailed view of the structure of the mounting shown in Figure 1.

Figure 4 is a sectional view on the line 4—4 of Figure 3.

Figure 5 is a sectional view corresponding to Figure 2 of a modification.

Figure 6 is a view similar to Figure 3 of the modification shown in Figure 5.

Referring to the drawing, the automobile body as a whole is indicated at 2. This body has the steel roof 4, the windshield 6, cowl 8, rear deck or trunk 10, rear fenders 12, hood 14, and front fenders 16. The body is mounted on the usual frame 18 which is supported on wheels 19 by springs in any suitable way.

Referring to Figure 2, the frame 18 is shown as of the usual U-channel type, and adjacent the lower flange 20 there is secured the U-shaped clip 22. The clip is secured to the frame by means of the bolt and nut 24.

At each side of the ears 26 of the clip 22, the L-shaped members 28 are mounted. The mounting is accomplished by means of a bolt 30 and the nut 32 secured thereon. If desired, the L-shaped members 28 may be formed integral by the connecting back piece 33 as shown in Figure 4. This connecting back piece has an opening at its middle for the reception of the tapered head 34 of the bolt 36 which passes through an over-size opening 38 in the frame 18. Between the back 33 and the frame 18 a rubber washer or biscuit 40 is provided and a similar biscuit 42 is positioned between the inside of the frame and the washer 44 surrounding the bolt 36. A nut 45 secures the bolt 36 in place.

The connection between the L-shaped members 28 and the body sill 46 comprises the T-shaped connector bolt 48, the head 50 of which is bored as is shown in Figure 4 and has mounted therein the spool shaped rubber bushing 52. The head 50 is received between the L-shaped members 28 at the angles thereof and through the spool 52 and the L-shaped members the bolt 54 passes and is secured in place by means of a nut 56. The shank of the bolt 48 extends upwardly through the sill 46 and is rigidly secured thereto by the nut 58.

The operation of the structure of Figures 2, 3, and 4 is as follows: when the frame 18 of the vehicle is subject to some unusual jolt or jar, the shock will not be immediately communicated to the body because of the resiliency of the rubber shown at 40, 42, and 52. The L-shaped brackets 28 are capable of pivoting about the bolt 30 and as the body and sills are spaced from the frame as indicated at 60 in Figure 2, a certain amount of the movement will be absorbed in the rubber. The lateral movement of the body relative to the frame will be absorbed by the rubber elements 40, 42, and 52, while the upward movement of the body relative to the frame will be absorbed by the rubber of the rubber spool 52. Depending upon whether a greater or less amount of movement is needed or required, a softer or harder rubber, respectively, may be used.

In Figures 5 and 6, a modification of the device is shown. To the frame 18 immediately adjacent the lower flange 20, a bolt 70 is passed through an eye in the lower arm 72 of an L-shaped bracket 74.

A rubber washer or biscuit 76 is placed between the inside of the arm 72 of the bracket and frame 18, and a second rubber washer or biscuit 78 is placed between the outer side of the bracket and head 80 of the bolt 70. A washer 82 is positioned between the head 80 and the rubber biscuit 78. A nut 83 holds the bolt 70 in place.

A U-shaped clip 84 is secured to the frame 18 by means of the bolt and nut 86, and to the ends of the arms of the clip 84 there is pivoted the middle part or angle of the L-shaped bracket 74. This pivotal action is accomplished by means of the bolt 88 which passes through the ends of the arms and through the bracket and has therearound the rubber spool 90. A shell 92 is positioned over the rubber spool 90 and this shell is received between the wings or sides 94 of the L-shaped bracket 74.

To the other arm 96 there is secured the bolt 98 which passes through the sill 46' and is secured to the arm 96 of the bracket 74 by means of the nut 100. A rubber biscuit or washer 102 is positioned between the upper flat part of the arm 96 and the bottom of the shell 46'. A suitable spacing cylinder 104 is positioned between the upper and lower parts of the sill 46'.

The operation of the device of Figures 5 and 6 is similar to that of the device of Figures 2–4 inclusive. The lateral movements of the body relative to the frame are taken by the rubber 76, 78 and 90 and the upward movements are absorbed by the rubber 90 and 102. Both of these species will allow a limited amount of lateral or vertical movement of the body with reference to the frame. In case it should be desired to provide a greater amount of movement in a horizontal direction than in a vertical direction, the rubber will be made softer with reference to the forces acting in the horizontal direction. On the other hand, where the movement in a vertical direction is desired to be greater, the rubber used in the connections enabling the vertical movement will be softer than the rubber used in the connections permitting the horizontal movement.

A small amount of movement longitudinally of the frame is allowed by the rubber spools 52 and 90. This movement is due to the fact that the rubber of the spool ends is positioned between the head 50 and the L-shaped members 28 (Figure 4) and between the end of the shell 92 and the arms of the clip 84 (Figure 6).

While the structure of the invention will allow a limited amount of movement in all directions, one of the principal features of the invention is that the construction provides either a greater amount of stiffness against a horizontal motion than against a vertical motion, or the stiffness in the vertical direction may be made greater than in the horizontal direction. The degree or amount of yield in any direction will depend on the softness of the rubber, a softer rubber allowing a greater amount of yield than a harder rubber. A considerable latitude of flexibility is therefore allowed by changing a hard rubber for a softer one, or a soft rubber for a harder one.

I claim:

1. In a mounting for the body of an automotive vehicle having a frame, a bracket at the side of the frame, a connection between one end of the bracket and the frame, a connection between the bracket and the frame at an intermediate part of the bracket, said connections including rubber to prevent a metal to metal contact and to enable a movement of the body relative to the frame, and a connection between the bracket and the body.

2. In a mounting for the body of an automotive vehicle having a frame, a bracket at the side of the frame, a connection between one end of the bracket and the frame, a connection between the bracket and the frame at an intermediate part of the bracket, and a connection between the bracket and the body, said connections including rubber to prevent a metal to metal contact and to enable a movement of the body relative to the frame.

3. In a mounting for the body of an automotive vehicle having a frame, a bracket at the side of the frame, a bolt passing through the bracket end and into the frame, rubber between the frame and the bracket and between the bracket and the bolt to allow a limited amount of movement of the bracket relative to the frame, a connection between the frame and an intermediate part of the bracket, said connection including a rubber member to allow a limited amount of movement of the bracket relative to the frame, and a connection between the other end of the bracket and the body, said connection including a piece of rubber positioned between the body and the bracket.

4. In a mounting between the body and the frame of an automotive vehicle, an L-shaped bracket, a connection between one end of one arm of the L and the frame, said connection including a bolt extending through the bracket and the frame and rubber elements between the bracket and frame and between the bolt and the bracket, a connection between the bracket and the frame at the angle of the L, said connection including a bolt, a rubber bushing through which the bolt passes, and a connection between the end of the other arm of the L and the body, said connection including a rubber pad between the bracket and the body.

5. In a mounting between the body and the frame of an automotive vehicle, said body having sills which extend beyond the sides of the frame, a clip secured to the frame, a bracket pivotally connected to the clip, said connection including rubber, a pivotal connection between the bracket and the frame including rubber, and a connection between the sill and the bracket, said sill being interconnected to the bracket intermediate its ends and said connection including rubber, said rubber connections allowing a limited amount of vertical and horizontal movement.

6. In a mounting for the body of an automotive vehicle having a frame, a bracket comprising L-shaped sides, said L-shaped sides being interconnected at one of their ends, means resiliently to secure the interconnecting ends to the frame, means resiliently to secure the other ends to the frame, and a pivotal connection between the body and the bracket, said last named connection being applied intermediate the bracket ends and including a resilient material to allow a limited amount of movement between the body and the bracket.

GUY E. PARKER.